L. HANSON.
MILKING STOOL.
APPLICATION FILED MAR. 17, 1913.

1,075,145.

Patented Oct. 7, 1913.

Louis Hanson, INVENTOR

UNITED STATES PATENT OFFICE.

LOUIS HANSON, OF COTTONWOOD, IDAHO.

MILKING-STOOL.

1,075,145.

Specification of Letters Patent.

Patented Oct. 7, 1913.

Application filed March 17, 1913. Serial No. 755,004.

*To all whom it may concern:*

Be it known that I, LOUIS HANSON, a citizen of the United States, residing at Cottonwood, in the county of Idaho and State of Idaho, have invented a new and useful Milking-Stool, of which the following is a specification.

The invention relates to improvements in milking stools.

The object of the present invention is to improve the construction of milking stools, and to provide a simple, practical and inexpensive milking stool, designed for the use of both male and female milkers, equipped with a milk pail support capable of receiving milk pails or buckets of different sizes and of supporting the same in an elevated position out of contact with the ground, and adapted to be readily adjusted to arrange such a receptacle at the proper elevation to suit the size of a cow, and capable also of leaving both hands of the operator free and at the same time prevent a milk pail from being kicked over.

A further object of the invention is to provide a milking stool adapted to afford a convenient seat of the desired height, and capable of being firmly supported in an upright position on hilly or uneven ground.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
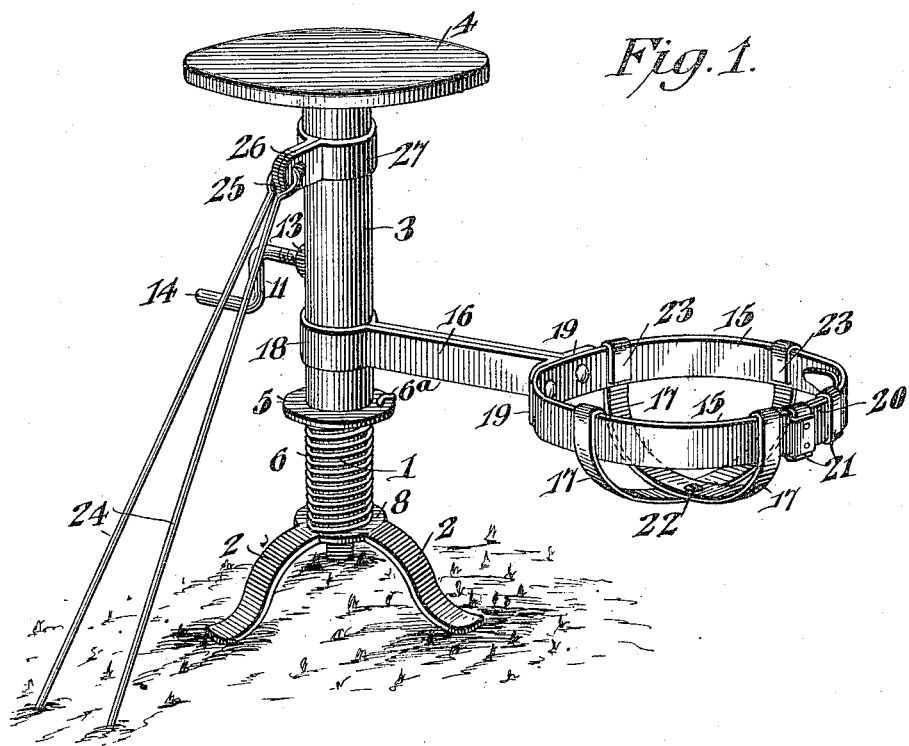
Figure 2:
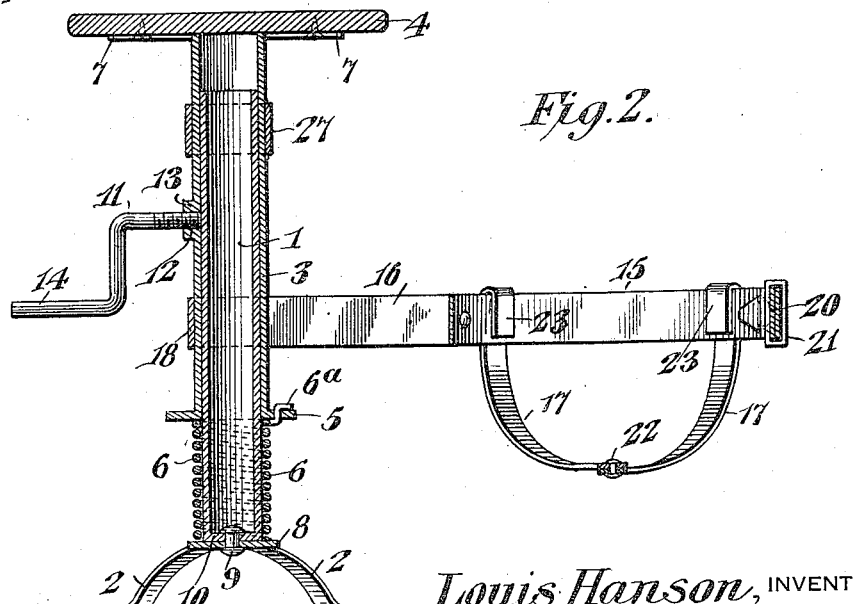

In the drawing:—Figure 1 is a perspective view of a milking stool, constructed in accordance with this invention. Fig. 2 is a central vertical longitudinal sectional view of the same.

Like numerals of reference designate corresponding parts in all the figures of the drawing.

In the accompanying drawing in which is illustrated the preferred embodiment of the invention, 1 designates a tubular standard provided at its lower end with legs 2 and receiving a vertically movable telescopic tubular section or sleeve 3, carrying a seat 4 at its upper end and provided at its lower end with a horizontal annular flange 5 to which is secured the upper end of a coiled spring 6. The tubular section 3 is slidable vertically to arrange the seat 4 at the proper elevation, and it is preferably split at its upper end to form horizontal attaching arms or portions 7, secured by screws or other suitable fastening devices to the lower face of the seat. The coiled spring 6 is disposed on the lower portion of the tubular standard and its lower end is seated upon a central connecting portion 8, formed integral with the legs 2 and secured by a rivet 9, or other suitable fastening device to the lower end 10 of the vertical standard, but the legs may be applied to the lower end of the standard in any other suitable manner, as will be readily understood. The coiled spring yieldably supports the vertically movable tubular section or sleeve 3 and is adapted to slide the same upwardly on the standard when the said tubular sleeve is free to move, and it is depressible to enable the seat to be lowered. By this construction, the seat is adapted to be adjusted to the desired elevation, and it is secured in its adjustment by means of a screw 11, mounted in a threaded opening 12 of a boss or enlargement 13 of the tubular standard and provided at its outer end with a crank handle 14 to enable it to be readily rotated to engage it with and disengage it from the standard. The screw 11 may be arranged at any desired point, and it enables the vertically adjustable seat carrying sleeve or member 3 to be rigidly secured at any desired elevation. The upper end 6ª of the spring is connected with the flange 5 by being passed through a perforation thereof and bent against the upper face of the flange, as clearly illustrated in Fig. 2 of the drawing, but the upper end of the spring may be secured to the tubular member in any other desired manner.

The vertically adjustable tubular member carries a milk pail support comprising in its construction a horizontal band 15, connected with the tubular member 3 by an arm 16 and supporting a pair of crossed approximately semicircular metallic straps 17 depending from the band and connected at their upper ends to the same, and coöperating therewith to form a basket for the reception of a milk pail or bucket to support the latter above the ground and also to hold the said receptacle in convenient position to receive the milk. The arm 16, which may be constructed in any suitable manner, is illustrated in the drawing as formed of a single continuous strip of metal, bent at its center to form a collar 18, which embraces the tubular member 3 and is slidable upwardly and downwardly thereon and adapted to retain itself in the desired vertical adjustment to frictional engagement with the tubular member, but any suitable means may be employed for positively fastening or clamping the collar 18 in its adjustment or the collar may be rigidly secured to the tubular member 3. The side portions of the strip of metal are suitably secured together to form an arm of two plies or thicknesses, and the terminal portions 19 of the strip are riveted or otherwise secured to the band 15 and are curved to fit the same.

The band 15, which is constructed of suitable resilient material, is connected at an intermediate point to the terminal attaching portions 19 of the arm 16, and its ends 20 are overlapped and are suitably connected with each other by loops or guides 21. Each of the terminals 20 is equipped with a loop or guide, which slidably receives the other terminal 20 of the band. By this construction, the band may be varied in size to fit the diameter of a milk pail or bucket, which is supported by the curved strips 17. The strips 17, which are also preferably constructed of resilient material, are secured together at the point of crossing by a rivet 22, or other suitable fastening device and their upper terminals are bent to form hooks 23, engaging over the upper edge of the horizontal band 15 and securing the supporting straps 17 to the same. When a milk pail or bucket is placed in the basket or holder formed by the adjustable band and the resilient supporting straps 17, it is securely held in proper position, and the bucket is adapted to be arranged through the vertical adjustment of the arm 16, or through the adjustment of the tubular member 3, either upon the ground or at any desired elevation within the range of its adjustment to suit the size of a cow and it leaves both hands of the milker free and effectually prevents the milk pail or receptacle from being kicked over by the animal. In practice the horizontal supporting arm 16 will extend between the legs of the milker and the milk pail will be supported in the usual position with relation to the knees of the person milking.

The milking stool is particularly adapted for use outdoors, and to enable it to be firmly supported in an upright position on inclined or uneven ground, it is equipped with a prop 24, preferably consisting of two legs or members, arranged at a slight angle and diverging upwardly and connected at their upper ends by an eye 25, which is linked into an outwardly extending ear 26, formed by outturned terminals of a collar 27, slidably embracing the tubular member 3 and adapted to be adjusted upwardly and downwardly thereon to arrange the prop or brace 24 in the proper position for supporting the milking stool. The adjustable collar 27 is also adapted to be turned on the tubular member 3 to arrange it at any side of the standard, and when the prop or brace is properly placed, it maintains the milking stool in a firm steady position.

What is claimed is:—

1. A milking stool comprising a vertical standard, a seat having a tubular member slidable on the standard, a spring mounted on the standard and arranged to yieldably support the tubular member and adapted to move the same upwardly on the standard, means for securing the tubular member in its adjustment, and a milk pail support arranged at a point between the seat and the lower end of the standard.

2. A milking stool comprising a vertical standard provided at its lower end with legs, a tubular member slidable on the standard and provided at its lower end with a flange, a coiled spring mounted on the lower portion of the standard and fitting against the said flange, a screw carried by the tubular member and arranged to engage the standard, and a milk pail support mounted on the tubular member.

3. A milking stool including a vertical standard, a horizontal arm consisting of a single continuous strip of metal bent centrally to form a collar to receive and slide on the said standard, the side portions of the strip being fitted together and the terminals of the strip being bent outwardly, and a basket comprising a band fitted against and secured to the terminals of the said strip, and crossed supporting strips forming the sides and bottom of the basket and secured to the said band.

4. A milking stool including a seat, upright supporting means for the seat, a milk pail support or holder carried by the said supporting means, and an adjustable brace or prop arranged at an inclination and provided at its upper end with a collar adjustably embracing the seat supporting means.

5. A milking stool including a seat, upright supporting means for the seat, a milk pail support or holder carried by the said supporting means, an inclined brace or prop composed of upwardly converging sides and an eye connecting the upper terminals of the sides, and a collar adjustably embracing the seat supporting means and provided with a projecting ear or portion having an opening into which the said eye is linked.

6. A milking stool including a vertical standard, a seat having a tubular member slidable on the standard to arrange the seat at different elevations, a milk pail support provided with a collar embracing the tubular member, and a prop or brace also provided with a collar, which adjustably embraces the said tubular member to permit the prop to be arranged at different elevations and in different positions.

In testimony, that I claim the foregoing as my own, I have hereto affixed my signature in the presence of two witnesses.

LOUIS HANSON.

Witnesses:
G. F. SIMON,
BART R. SIMON.